United States Patent [19]

Welborn

[11] Patent Number: 4,744,487
[45] Date of Patent: May 17, 1988

[54] FOOD CONTAINER WITH A HINGED COVER

[75] Inventor: Kenneth G. Welborn, Santa Cruz, Calif.

[73] Assignee: Harmony Foods, Inc., Santa Cruz, Calif.

[21] Appl. No.: 98,223

[22] Filed: Sep. 16, 1987

[51] Int. Cl.[4] ...................... B65D 43/14; B65D 51/04
[52] U.S. Cl. .................................... 220/342; 220/335
[58] Field of Search ...................... 220/334, 335, 342; 16/171, 180, DIG. 6

[56] References Cited

U.S. PATENT DOCUMENTS

| | | | |
|---|---|---|---|
| 2,742,665 | 4/1956 | Stopek | 220/342 |
| 3,204,288 | 9/1965 | Adams | 220/342 |
| 4,179,844 | 12/1979 | Stever | 220/342 |
| 4,684,017 | 8/1987 | Watanabe et al. | 220/342 |

*Primary Examiner*—George T. Hall
*Attorney, Agent, or Firm*—Banner, Birch, McKie & Beckett

[57] ABSTRACT

There is disclosed a food container from which bulk food or candy is adapted to be disbursed, in which the opening in the container is closed by a hinged cover that includes an integrally molded hinge pin adapted to be seated in an upwardly open groove in the container and in which it is secured by a plastic clip that is adapted to be snapped in place and comprises a first leg that extends through a slot in the cover over the hinge pin and a second leg opposed to the first leg and extending through the access opening into the container, together with a rounded end portion that encircles the hinge area. For assembling, the first leg of the spring clip has a free end that extends over a channel in the top wall of the container so that the hinge pin can be inserted under the free end and drawn forward to deflect the first leg of the clip until the hinge pin falls into the groove.

9 Claims, 3 Drawing Sheets

FOOD CONTAINER WITH A HINGED COVER

This invention relates to a food container of the type from which bulk food or candy is adapted to be dispensed and particularly to the hinged cover for closing the access opening of such of a food container.

BACKGROUND OF THE INVENTION

Self-service type containers for food or candy can be found for example in supermarkets. The containers normally are molded of transparent plastic that displays the contents and are made with flat walls so that they can be readily stacked or mounted on shelves. The access opening is provided in the front wall of the container, which can be inclined to permit more convenient access to the goods inside, and is normally closed for sanitary reasons by a hinged cover. The contents of the container are intended to be removed from the container by the customer and put into a separate package that is closed, weighed and priced. For removing the contents from the container, there is usually provided—also for sanitary reasons as well as for convenience—a scoop that may be tethered to the container for example or seated in a pocket formed integrally with or attached to the container.

The covers of containers of this kind have been hinged to the container for example by short pivot pins or trunnions molded integrally with the cover and extending laterally from opposite sides of the cover or from lugs depending from the cover. The pins are adapted to be seated in recesses or depressions formed in the side walls of the container which, for assembly, require that the side walls of the container be sprung apart to permit the lugs to be moved into alignment with the recesses. When the side walls are released and recover the pins enter and are seated in the recesses.

Other arrangements for pivoting the cover to the container may include for example a boss or offset at the top of the cover that is disposed between a pair of lugs upstanding from the wall of the container, and a pivot pin inserted through the lugs and the boss.

Containers of this nature are designed as single-use throw-away units and are therefore made relatively light and inexpensively. At the same time, being exposed to customers in a self-service environment, they are subject to harsh and demanding use. Covers that are hinged to the containers by trunnions seated in recesses in the side walls can be popped loose and can be improperly replaced or not replaced at all, which means that the contents of the container are not properly covered,, or the covers can be knocked onto the floor for example and are no longer suitable for use with a food container. A cover that is hinged to the container by a pivot pin extending through lugs upstanding from the container can become loose when the pivot pin is removed or falls out or when a lug is broken.

The objects of this invention are to provide a food container in which the cover is more securely fastened to the container and which at the same time is relatively inexpensive and easy to assemble.

SUMMARY OF THE INVENTION

In accordance with this invention there is provided a food container in which the cover for the access opening is hinged to the container by a hinge pin formed integrally with the cover and seated in an upwardly-open groove in the edge of the container adjacent the access opening. The hinge pin is adapted to be retained in the groove by a clip having an outer leg that overlies the open side of the groove. The clip is retained in its assembled position by an end portion that extends under the bottom of the groove and an inner leg extending inwardly of the container on the inner side of the side wall of the container opposed to the outer leg. At its free end, the inner leg may be formed with a flange that diverges relative to the outer leg to provide for opening the clip to insert it over the groove and hinge pin. For assembly purposes, the container may be provided with a transverse channel parallel to the axis of the groove over which the end of the outer leg extends, whereby the hinge pin can be inserted under the free end of the outer leg and forced under the same until it falls into the groove.

DETAILED DESCRIPTION OF THE INVENTION

With reference to the drawings, there is shown a food container 1 formed for example by blow molding from clear plastic material.

Figure 1:
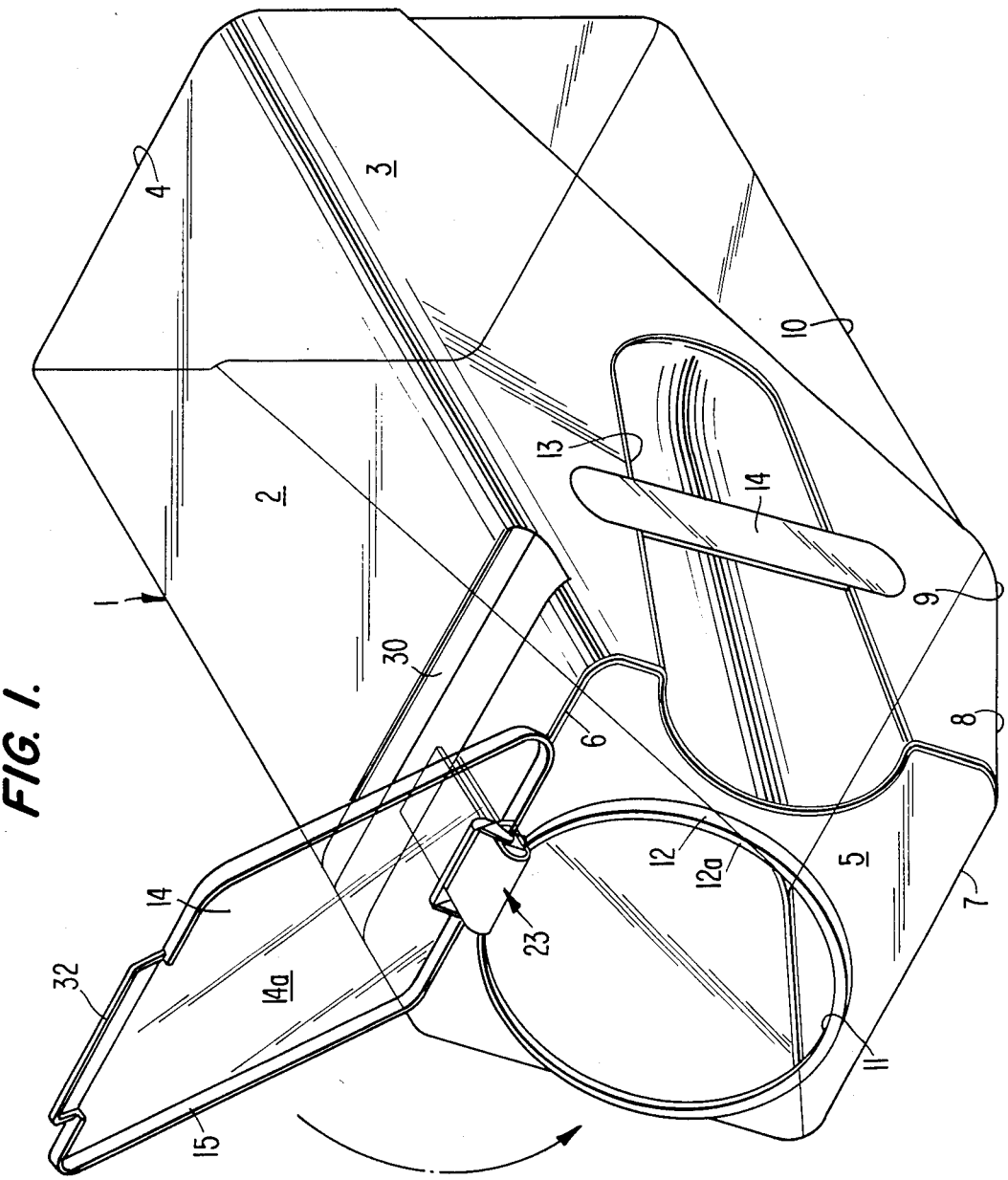
FIG. 1 is a perspective view of a container embodying the present invention.

The container 1 is substantially rectangular in cross section with substantially planar walls including a top wall 2 and a right side wall 3. The container is closed at the rear by a rear wall 4 (FIG. 1) and at the front by a front wall 5 that is inclined downwardly at an angle that may be for example about sixty degrees relative to the top wall 2. The front wall 5 extends from the front edge 6 of the top wall 2 to an intermediate edge 7 at the upper end of a lower front wall 8 that extends from the intermediate edge 7 to the front edge 9 of the bottom wall 10.

The front wall 5 is provided with an access opening 11 surrounded by a flange 12 upstanding from and substantially normal to the front wall 5 and having an inwardly directed lip 12a at its free upper end, the lip 12a being widest at the bottom of the opening 11 and reduced in width to substantially nothing at the top thereof. The container is adapted to be filled through the opening 11 through which the contents of the container are also adapted to be dispersed. In normal use such as by a customer in a supermarket, the customer would use a scoop (not shown) that may be stored for example in a recess 13 in the right side wall 3 of the container—which may also be provided with a cross piece 14 fastened to the side of the container and spanning the recess 13 to form a pocket in which the scoop is stored. The customer would remove from the container whatever quantity of the contents is desired that would then be put in a separate bag that is closed, weighed and priced for checkout purposes.

The access opening 11 is adapted to be closed by a cover 14 having a depending flange 15 at the periphery thereof that is slightly less in height than the flange 12 so that the free edge of the flange 15 is adapted to be spaced from the front wall 5 of the container about the opening 11 when the cover 14 is in its closed position—that is, when it is disposed over the opening 11 and resting on the lip 12a at the top of the flange 12.

Figure 2:
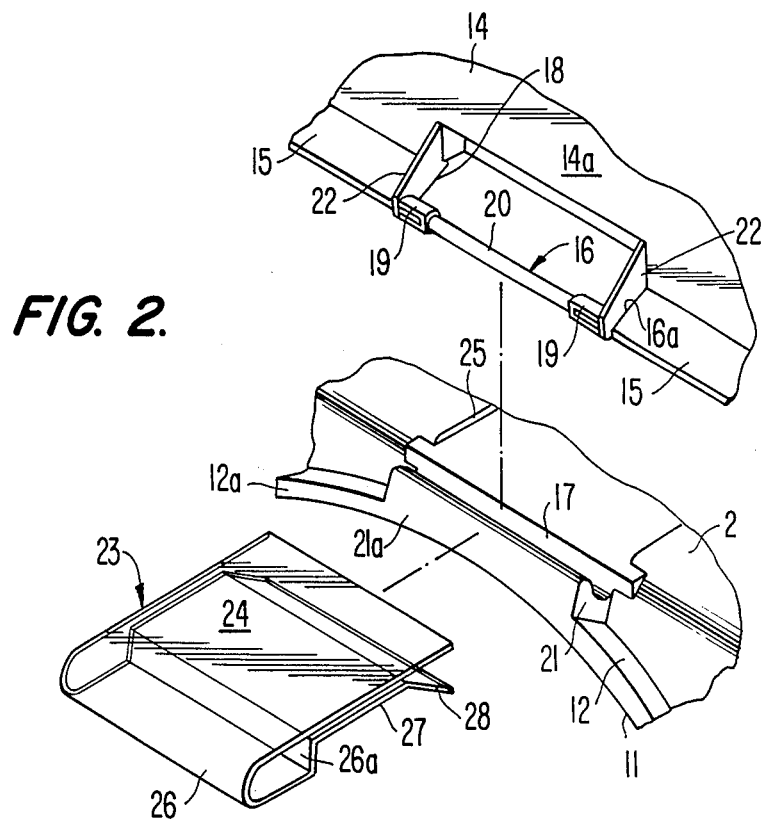
FIG. 2 is a fragmentary exploded view of the hinge portion of the container of FIG. 1.

The cover 14 is hinged at its upper edge to the container 1 by a pair of hinge elements comprising a hinge pin 16 (FIG. 2) on the cover 14 and a groove 17 on the flange 12 about the access opening 11.

The hinge pin 16 is formed in a gap 16a (FIG. 2) in the flange 15 adjacent the top or free edge thereof to provide an opening or slot 18 between the plate 14a of the cover 14 and the hinge pin 16. For molding purposes, the hinge pin 16 is formed with stub-like ends 19 having substantially round exterior surfaces that are pivotally received in the groove 17 but are hollow, or more particularly U-shaped in cross section, and are connected together by a solid intermediate rod-like connecting portion 20 of reduced diameter.

The groove 17 is formed in a boss 21 that is integral with the flange 12 on the front wall 5 and is open upwardly or outwardly relative to the opening 11. The axis of the groove 17 defines the pivot axis of the cover 14 and is disposed in a plane normal to the axis of the opening 11 of the container. The boss 21 has a front face 21a that is co-planar with the lip 12a of the flange 12 and is less wide circumferentially of the opening 11 than the gap 16a in the flange 15 to fit loosely between the side walls 22a at the ends of the gap 16a and on which the ends 19 of the hinge pin 16 are formed.

Figure 5:
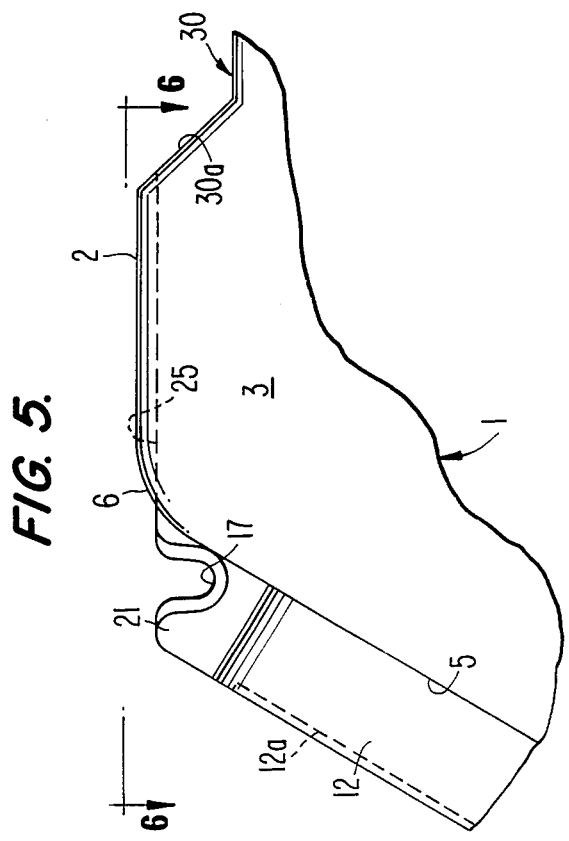
FIG. 5 is a fragmentary view of the hinge portion of the container of FIG. 1.

To hold the hinge pin 16 in the groove 17 there is provided a resilient plastic clip 23 that is substantially as wide as the boss 21 and includes a planar outer leg 24 that is adapted to be inserted through the opening 18 between the hinge pin 16 and the opposed edge of the plate 14a of the cover 14 and to overlie the top wall 2 of the container 1—and is preferably, for aesthetics as well as to confine the clip, seated in a shallow depression 25 (FIGS. 2 and 5) in the top wall 2. The top of the boss 21 is slightly lower than the top wall of the container to permit the outer leg 24 to lie flat in the depression 25 of the top wall 2.

The clip 23 also includes a rounded end portion 26 and a planar inner leg 27 that is adapted to be inserted through the opening 11 of container 1 to underlie the top wall 2—or more particularly the depression 25 of the top wall 2—opposite the outer leg 24 to clamp the top wall 2 between the same. The rounded end portion 26 is designed to pass through the opening 11 and thus to encircle the boss 21 with the clip being deep enough relative to the curvature of the access opening 11 so that the bottom edge of the front wall 21a engages the side edges at the bottom of the end portion 26 when the clip is in position on the container. The end portion 26 also encircles the bottom wall of the groove 17 and includes a rear wall 26a that is adapted to engage behind a rear wall 17a of the groove 17. To minimize the dimension that must be encircled by the end portion 26 of the clip, the opening 11 is formed relatively closely adjacent at its uppermost point to the top wall 2. The outer leg 24 and inner leg 27 are thus in planar engagement with the top wall 2 of the container on the outer and inner faces thereof respectively. The end portion 26 also resiliently biases the legs 24 and 27 together to clamp the clip 23 on the top wall 2 while permitting the legs to be sprung apart and thus separated sufficiently to permit the clip to be readily applied to and removed from the container.

Figure 3:
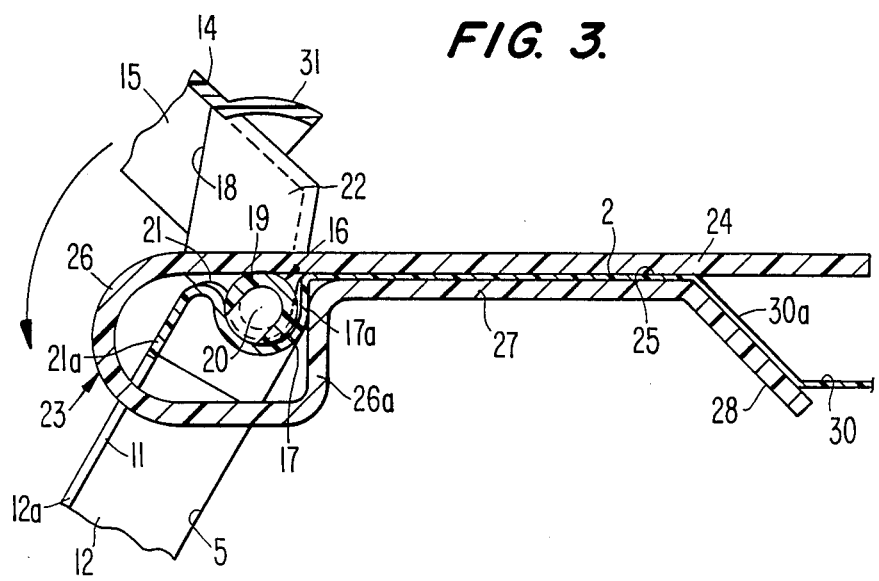
FIG. 3 is a vertical sectional view through the hinge of the container of FIG. 1 showing the cover in raised position.
Figure 6:
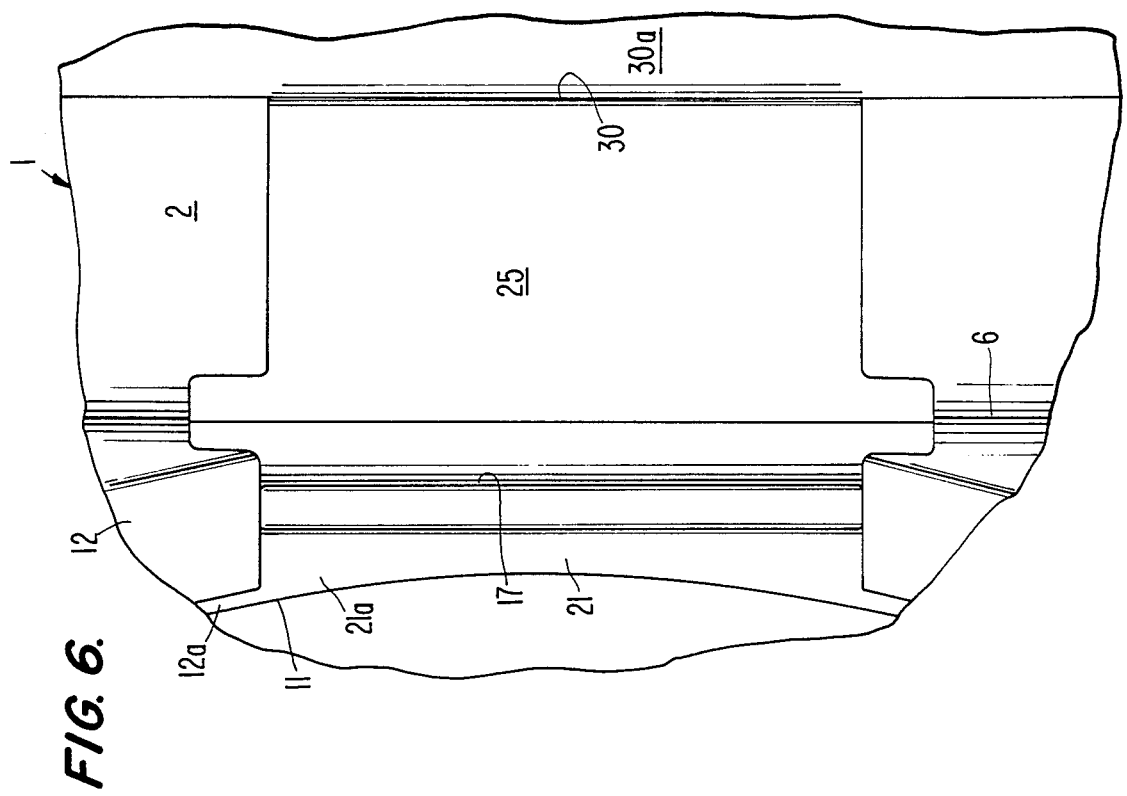
FIG. 6 is a fragmentary detail view substantially on the line 6—6 of FIG. 5.

When the clip 23 is in its operative position as shown in FIG. 3, the outer leg 24 thereof overlies and closes the upwardly open groove 17 to retain the hinge pin 16 therein. To facilitate inserting the clip into its operative position, the inner leg 27 is formed with a free end 28 that extends out of the plane thereof to diverge relative to the upper leg 24 and thus provide a mouth to receive the boss 21. When the clip 24 is forced against the boss, it is automatically sprung apart and will then recover as soon as the rear wall 26a thereof has passed the wall 17a.

The container is formed with a transverse groove 30 in the top wall 2 spaced from and parallel to the edge 6. The groove 30 is spaced relative to the length of the leg 24 of the clip 23 so that the outer leg 24 extends over the groove 30 to provide a free end that overhangs the groove 30. The hinge pin 16 can be inserted under the free end of the leg 24 during assembly and drawn forwardly between the leg 24 and top wall 2 as the leg 24 is deflected upwardly until the hinge pin 16 reaches and falls into the groove 17.

The free end 28 diverges downwardly at an angle conforming to the angle of the side wall 30a of the groove 30 and is spaced relative to wall 26a to lie against the side wall 30a and thus locks the clip 23 between the walls 17a and 30a. The end 28 is also long enough to extend beyond the bottom of the groove 30 inside the container so that, if it becomes necessary to remove the clip from the container, the end can be grasped to spring the leg 27 downwardly until the wall 26a is clear of the wall 17a and the clip can be withdrawn.

Figure 4:
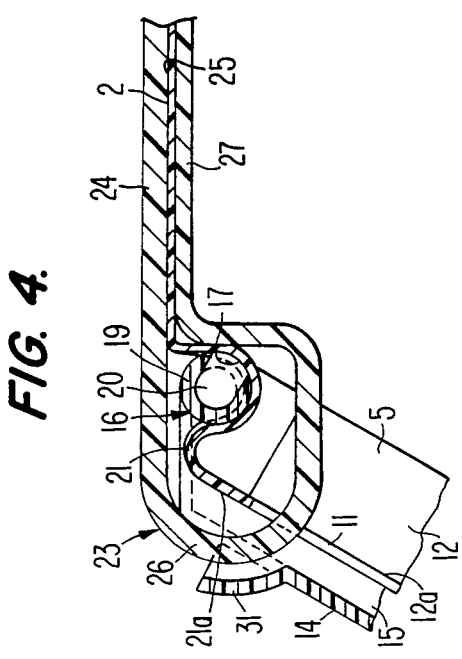
FIG. 4 is a view similar to FIG. 3 but with the cover in a closed position.

The cover 14 is formed with a hood 31 that is adapted to lie over the end portion 26 of the clip when the cover is closed as shown in FIG. 4 to minimize the opening into the container. The cover 14 is also formed with a finger piece 32 (FIG. 1) at the free end to provide for raising and lowering the cover 14.

Being arranged on the inclinded end wall 5, the cover 14 is normally biased by gravity into its closed position. The hinge is also relatively inexpensive to form and to assemble, while at the same time, is less apt to be broken or disassembled in normal use.

I claim:

1. In a food container having a first wall and a second wall disposed at an angle to said first wall and an access opening in said second wall through which said container is adapted to be filled and through which the contents thereof are adapted to be disbursed, said access opening having an edge thereof adjacent to said first wall, a cover for said opening, and means for hinging said cover to said container comprising an upwardly open groove formed in said container adjacent to and disposed with the axis thereof in a plane substantially normal to the axis of said opening, a hinge pin on said cover at the edge thereof and adapted to be seated in said groove for pivoting the cover on said container, said cover having a slot along the edge thereof inwardly of said hinge pin and a clip having an inner leg and an outer leg and an intermediate end portion, said outer leg being adapted to extend through said slot and to overlie the wall of said container adjacent said access opening and the open side of said groove to retain said hinge pin therein, said intermediate end portion being adapted to extend about the wall of said container about said access opening and the bottom wall of said groove and said inner leg being opposed to said outer leg and adapted to underlie the wall of said container opposite from said outer leg, said clip being resilient and normally biased into a closed position in which said outer and inner legs are in engagement and adapted to be opened for inserting the outer portion of said clip through said slot in said cover and over said groove and the wall of said container while the inner portion thereof passes beneath said groove and the wall of said container.

2. In a food container in accordance with claim 1 in which said inner leg of said clip is formed at the free edge thereof with a flange diverging relative to said outer leg to provide for camming said clip over the bottom of said groove.

3. In a food container in accordance with claim 1 in which said container includes a channel in said first wall spaced inwardly from said groove and said outer leg of said clip extends to a free end over said channel whereby said hinge element can be inserted under said outer leg and moved into said groove by deflecting said outer leg.

4. In a food container in accordance with claim 3 in which said inner leg of said clip is formed at the free end thereof which a flange diverging relative to said outer leg to provide for camming said clip over the bottom wall of said groove and cooperating with the side wall of said channel whereby said inner leg is confined against endwise movement in one direction by engagement of the flange against the side wall of said channel and in the other direction by the engagement of said end portion of said clip with the side wall of said groove.

5. In a food container in accordance with claim 1 in which said second wall includes an upstanding flange surrounding said access opening, said groove being formed in said upstanding flange and said cover being adapted to engage the rim of said flange when in its closed position.

6. In a food container in accordance with claim 1 in which said cover includes a depending flange about the periphery thereof and said hinge element is formed in said depending flange.

7. In a food container in accordance with claim 1 in which said end portion of said clip includes a wall adapted to extend behind the wall of said groove substantially into engagement with said first wall to hold said clip in position, said end portion being adapted to be opened to provide for removing said clip from said container.

8. In a food container in accordance with claim 1 in which the edge of said access opening adjacent to said first wall is circular and said clip has a width and depth whereby the sides of said clip engage said access opening with the outer leg thereof closing the outwardly open side of said groove.

9. In a food container having a planar top wall and a planar front wall inclined relative to said top wall and an access opening in said front wall through which said container is adapted to be filled and through which the contents thereof are adapted to be disbursed, said access opening having one edge thereof adjacent to said top wall, an upstanding flange on said front wall surrounding said opening, a cover for said opening and having a depending flange adapted to overhang said upstanding flange when said cover is in the closed position, and means for hinging said cover to said container comprising an outwardly open groove in said upstanding flange adjacent to said top wall and disposed substantially parellel to said top wall, a hinge element on said dependant flange of said cover and adapted to be seated in said groove for pivotally supporting said cover on said container, said cover having a slot along the edge thereof inwardly of said hinge element, and a clip having an outer leg adapted to extend through said slot and overlie said top wall and the open side of said groove to retain said hinge element therein, an end portion adapted to extend beneath said upstanding flange and the bottom wall of said groove and an inner leg opposed to said outer leg and adapted to underlie said top wall opposite said outer leg, said clip being resilient and normally biased into a closed position with said outer and inner legs thereof in engagement and adapted to be opened for inserting the outer leg of said clip through said opening in said cover and over said groove and said top wall and for inserting said inner leg beneath said groove and the top wall of the container.

* * * * *